G. & J. SEIBERT.
Wheel Cultivator.
No. 82,646.
2 Sheets—Sheet 1.
Patented Sept. 29, 1868.
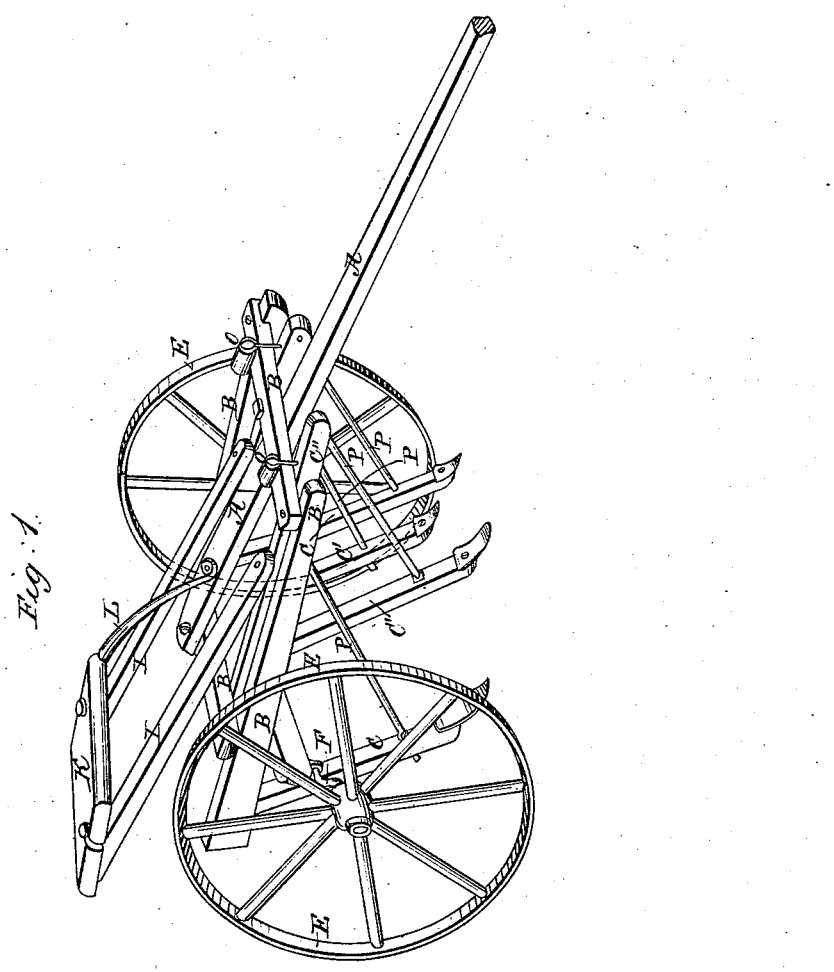

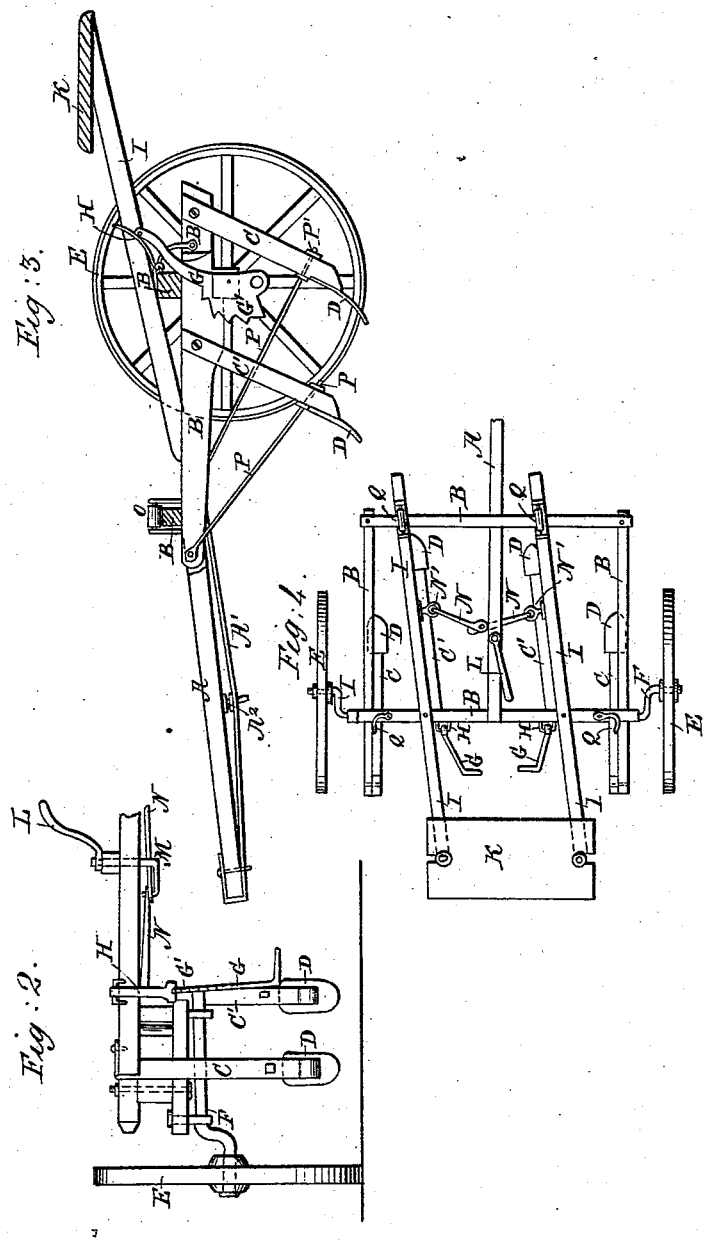

United States Patent Office.

GEORGE SEIBERT AND JOHN SEIBERT, OF ASHLEY, ILLINOIS.

Letters Patent No. 82,646, dated September 29, 1868.

IMPROVEMENT IN CULTIVATOR.

*The Schedule referred to in these Letters Patent and making part of the same.*

TO ALL WHOM IT MAY CONCERN:

Be it known that we, GEORGE SEIBERT and JOHN SEIBERT, of Ashley, in the county of Washington, and State of Illinois, have invented a new and useful Improvement in Cultivators; and we do hereby declare that the following is a full, clear, and exact description of the same, reference being had to the annexed drawings, making part of this specification, in which—

Figure 1 is a perspective view.
Figure 2 is a rear elevation, showing one-half of the machine.
Figure 3 is a longitudinal vertical section.
Figure 4 is a plan.

The same letters in all the figures are used to indicate the same parts.

A is the tongue, which is braced by the rod $A^1$. This is attached rigidly to the front and rear of the frame B. A screw-stud, $A^2$, passing through the rod, presses against the tongue, so as to spring it upwards, so that the tongue may be made light, and yet be sufficiently staunch.

C C and C' C' are the standards, to which the shovels D are attached. The outer standards, C and C, are fastened by bolts to the side-pieces of the frame, projecting to the rear behind the axle.

E E are the wheels, the spindles of which are upon the crank-axles F F, fastened to the lower side of the frame. These axles may be independently turned by means of levers, G G, attached thereto, and actuated by the driver's feet, so that the frame may be raised and lowered on both sides, or on either side, in such manner as may be required by inequalities of the ground. There are notched plates, $G^1$, on the levers, against which the pawls H H rest, so as to support the axles in any required position.

The interior beams C" C" are pivoted to the rear part of the frame by bolts, which pass also through the braces I I, which are bolted to the beams C" C", and support the driver's seat, K, placed in rear of the axle.

A lever, L, is attached to a crank, M, passing through the tongue, and so arranged that the driver may operate, by means of the connecting-rods N N upon the beams C" C", to move the plows attached thereto to one side or the other. The same movement may be effected by the driver pressing his feet against stirrups, Q, on the frame, either independently of or in conjunction with the lever L.

The connecting-rods N N are fastened to eye-bolts, N', passing through the beams C" C", and, by lengthening or shortening these bolts, the distance between the plows may be regulated.

Friction-rollers, O O, are placed over the front beam of the frame B, turning on staples passing over the frame, and fastened to the front end of the beams C" C".

The standards are supported by iron rods, P P, which are fastened thereto by nuts, P', so that by lengthening or shortening the rods, the depth of cut of the shovels D may be regulated.

What we claim as our invention, and desire to secure by Letters Patent, is—

1. The combination of the frame, the wheels, and two independent axles, F F, with the levers G, ratchet-plates G', and pawls H, substantially as and for the purpose set forth.

2. The combination of the driver's seat, K, braces I, and interior beams C" C", so arranged that the latter may be moved laterally by the action of the driver, substantially in the manner set forth.

3. The combination of the parts last aforesaid with the lever L, crank M, and connecting-rods N, substantially as set forth.

4. The combination of the frame B, the oscillating beams C" C", and friction-rollers O, arranged to operate substantially as described.

5. The combination of the connecting-rods N N, the oscillating beams C" C", and the eye-bolts N', for regulating the relative position of the plows, substantially as described.

6. The arrangement of the tongue A, brace-rod $A^1$, and stud-screw $A^2$, substantially as and for the purpose set forth.

In testimony whereof, we have signed our names to this specification in the presence of two subscribing witnesses.

GEORGE SEIBERT.
JOHN SEIBERT.

Witnesses:
THOS. H. BOYD,
HENRY KRAMER.